(12) United States Patent
Chen et al.

(10) Patent No.: US 12,109,571 B2
(45) Date of Patent: Oct. 8, 2024

(54) TOOL-INTEGRATED MEDICAL WASTE STERILIZATION PROCESSING BARREL

(71) Applicant: ZHEJIANG WEIDUN ENVIRONMENTAL TECHNOLOGY CO., LTD., Hangzhou (CN)

(72) Inventors: Yiming Chen, Hangzhou (CN); Weixing Chen, Hangzhou (CN); Junfeng Liu, Hangzhou (CN); Guanzhong Huang, Hangzhou (CN)

(73) Assignee: ZHEJIANG WEIDUN ENVIRONMENTAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/670,272

(22) Filed: May 21, 2024

(65) Prior Publication Data
US 2024/0299949 A1  Sep. 12, 2024

Related U.S. Application Data

(63) Continuation of application No. PCT/CN2022/140944, filed on Dec. 22, 2022.

(51) Int. Cl.
| | |
|---|---|
| B02C 19/00 | (2006.01) |
| B02C 18/12 | (2006.01) |
| B02C 18/18 | (2006.01) |
| B02C 18/24 | (2006.01) |

(52) U.S. Cl.
CPC .......... *B02C 19/0075* (2013.01); *B02C 18/12* (2013.01); *B02C 18/18* (2013.01); *B02C 18/24* (2013.01)

(58) Field of Classification Search
CPC ..... B02C 19/0075; B02C 18/12; B02C 18/18; B02C 18/24
See application file for complete search history.

(56) References Cited

FOREIGN PATENT DOCUMENTS

| | | | |
|---|---|---|---|
| CN | 102818441 A | * 12/2012 | |
| CN | 110653046 A | 1/2020 | |
| CN | 112902607 A | * 6/2021 | ............. B02C 18/08 |

OTHER PUBLICATIONS

English translate (CN112902607A), retrieved date Jul. 10, 2024.*
English translate (CN102818441A), retrieved date Jul. 10, 2024.*

* cited by examiner

*Primary Examiner* — Mohammed S. Alawadi
(74) *Attorney, Agent, or Firm* — Westbridge IP LLC

(57) ABSTRACT

A tool-integrated medical waste sterilization processing barrel includes a treatment barrel, a discharge port set at a bottom edge of the treatment barrel, and an integrated cutting tool is provided at the bottom of the treatment barrel; the integrated cutting tool includes a mounting block in a shape of truncated square pyramid, the mounting block has a cutter on each bevel, the cutter is in a plane parallel to the corresponding bevel of the mounting block, the mounting block has a power chamber with a downward opening, the power chamber has a power member, the input end of the cutter extends into the power chamber and is connected to the output end of the power member, and a rotating member is connected between the mounting block and the treatment barrel.

5 Claims, 5 Drawing Sheets

TOOL-INTEGRATED MEDICAL WASTE STERILIZATION PROCESSING BARREL

CROSS-REFERENCE TO RELATED APPLICATIONS

The present application is a continuation of International Patent Application No. PCT/CN2022/140944, filed on Dec. 22, 2022, which claims priority to Chinese Patent Application No. 202111395772.6, filed on Nov. 23, 2021. The disclosures of the above-mentioned applications are incorporated herein by reference in their entireties.

TECHNICAL FIELD

The present application relates to the field of medical waste disposal equipment, and in particular to a tool-integrated medical waste sterilization processing barrel.

BACKGROUND

With the development of medical technology and science and technology, the current medical level is becoming more and more mature under the impetus of science and technology. Nowadays, many technological machines are constantly put into the field of medical health, and medical instruments and equipment are increasing rapidly. The use of medical cabinets will produce medical waste after being used. Medical waste refers to contaminated waste produced by hospitals that has been in contact with patients' blood, flesh, etc. If handled improperly, it will cause serious environmental pollution and may become a source of epidemic diseases. Therefore, it is necessary to recycle and dispose of medical waste after use.

Existing medical waste treatment equipment usually adopts the method of crushing, and the crushing cutter is often placed at the bottom of the equipment. When the waste contains metal, the cutter is easy to be damaged, reducing its crushing efficiency, and the work needs to be interrupted to replace the cutter, affecting the crushing speed. Therefore, it is urgent to design a medical treatment machine that can reduce tool wear.

SUMMARY

The purpose of the present application is to provide a medical treatment machine capable of reducing tool wear in response to the problem that the metal in medical waste in the prior art tends to damage tools.

To achieve the above purpose, the technical solution adopted by the present application is as follows.

A tool-integrated medical waste sterilization processing barrel includes a treatment barrel, a discharge port set at a bottom edge of the treatment barrel, and an integrated cutting tool provided at the bottom of the treatment barrel. The integrated cutting tool including a mounting block in a shape of truncated square pyramid, the mounting block having a cutter on each bevel, the cutter being in a plane parallel to the corresponding bevel of the mounting block, the mounting block having a power chamber with a downward opening, the power chamber having a power member, the input end of the cutter extending into the power chamber and is connected to the output end of the power member. A rotating member is connected between the mounting block and the treatment barrel.

Preferably, the power member includes a motor fixedly mounted at the bottom of the treatment barrel, the output end of the motor extending upwardly through the treatment barrel into the power chamber, the output end of the motor being connected with a gear box by transmission, the gear box being connected to the input end of the cutter.

Preferably, the cutter includes a rotating shaft rotatably attached to the mounting block, the rotating shaft axis being perpendicular to the corresponding bevel of the mounting block, the rotating shaft having a crushing knife fixedly set on it, the rotating shaft extending through the mounting block into the power chamber, the rotating shaft being connected to the gear box.

Preferably, the rotating member includes an annular electromagnetic sliding chute provided at the bottom of the treatment barrel, two symmetrically provided electromagnetic sliders slidingly connected in the electromagnetic sliding chute, the electromagnetic sliders extending upward into the power chamber, the two electromagnetic sliders having fixed rings fixedly connected at their upper ends, the fixed rings having four fixed rods fixedly connected evenly along the circumference, the fixed rods being fixedly connected to the mounting block the fixing bars are fixedly connected to the mounting block.

Preferably, a push plate is fixedly connected to the corner of the mounting block, the treatment barrel is cylindrical, the push plate is perpendicular to the inner wall of the treatment barrel, and the push plate is connected against the inner wall of the treatment barrel.

Preferably, an end cover is provided at the top of the treatment barrel, one end of the end cover being hinged to the treatment barrel by an articulating block, and the other end of the end cover being connected to the treatment barrel by a snap. Preferably, the motor is fixedly provided with a mounting ring, and the mounting ring is bolted to the bottom of the treatment barrel.

The advantage of the present application is as follows.

The medical waste is crushed by means of cutter set on the inclined surface of the mounting block, and because the plane where the cutter are located is at an angle to the ground of the treatment barrel, it makes the cutter bounce off the metal in the medical waste when they come in contact with it, after which the metal remains at the bottom of the treatment barrel due to gravity, which reduces the contact area between the cutters and the metal in direct contact with the metal and reduces the cutters' wear rate compared to the cutters in the prior art that are parallel to the bottom surface of the treatment barrel setting, in the meanwhile the four the cutters are distributed in a conical shape, which has a strong tearing force when dealing with longer waste and improves the crushing efficiency, and by the setting of the rotating member, when the material needs to be discharged, the rotating member is activated, which causes the rotating member to drive the mounting block to rotate, and the cutter on the mounting block rotates accordingly, and at the same time with the cutter rotating itself, it makes it easier for the crushed medical waste to be discharged from the discharge port, reducing the accumulation of waste in the treatment barrel, and at the same time when the mounting block rotates, the four corners of the mounting block push the waste to the outside, making it discharged from the discharge port.

DETAILED DESCRIPTION OF THE EMBODIMENTS

The specific embodiments provided by the present application are described in detail below in conjunction with the accompanying drawings.

The present application will be described in detail in the following in connection with the accompanying FIGS. 1 to 6 to provide a clear and complete description of the technical solutions in the embodiments of the present application. Obviously, the described embodiments are only a part of the embodiments of the present application, and not all of them. Based on the embodiments in the present application, all other embodiments obtained by a person of ordinary skill in the art without making creative labor fall within the scope of protection of the present application.

Figure 1:
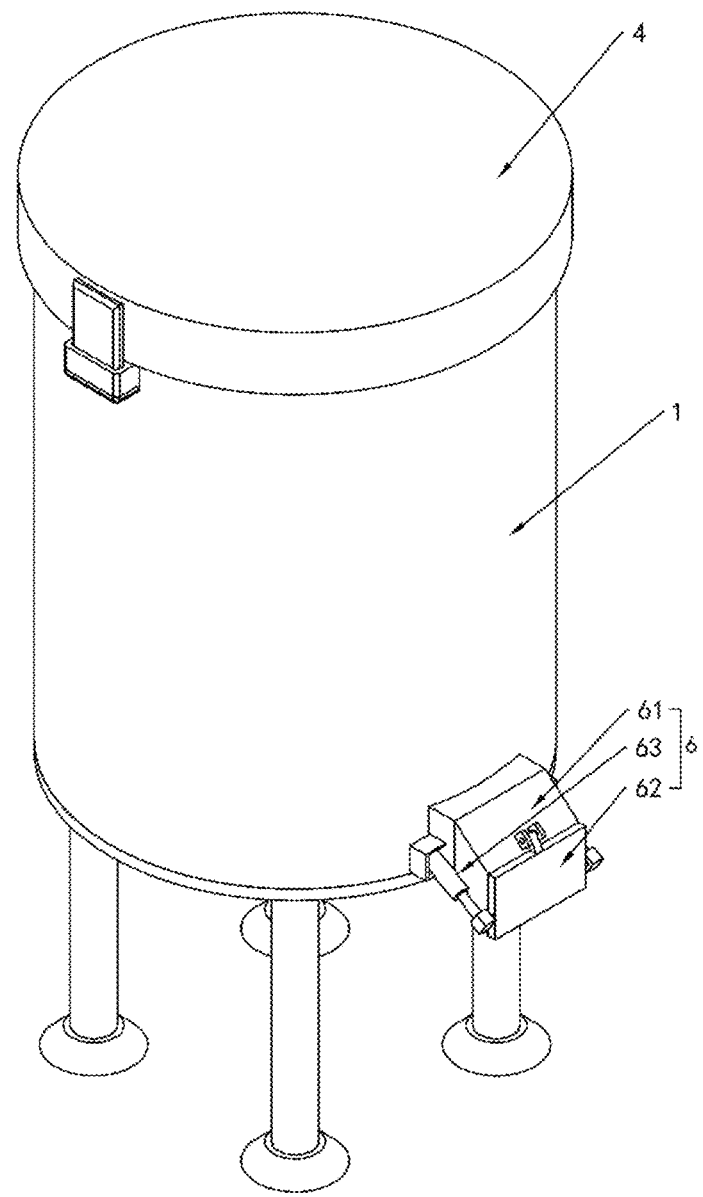
FIG. 1 is a three-dimensional view of the present application.
Figure 2:
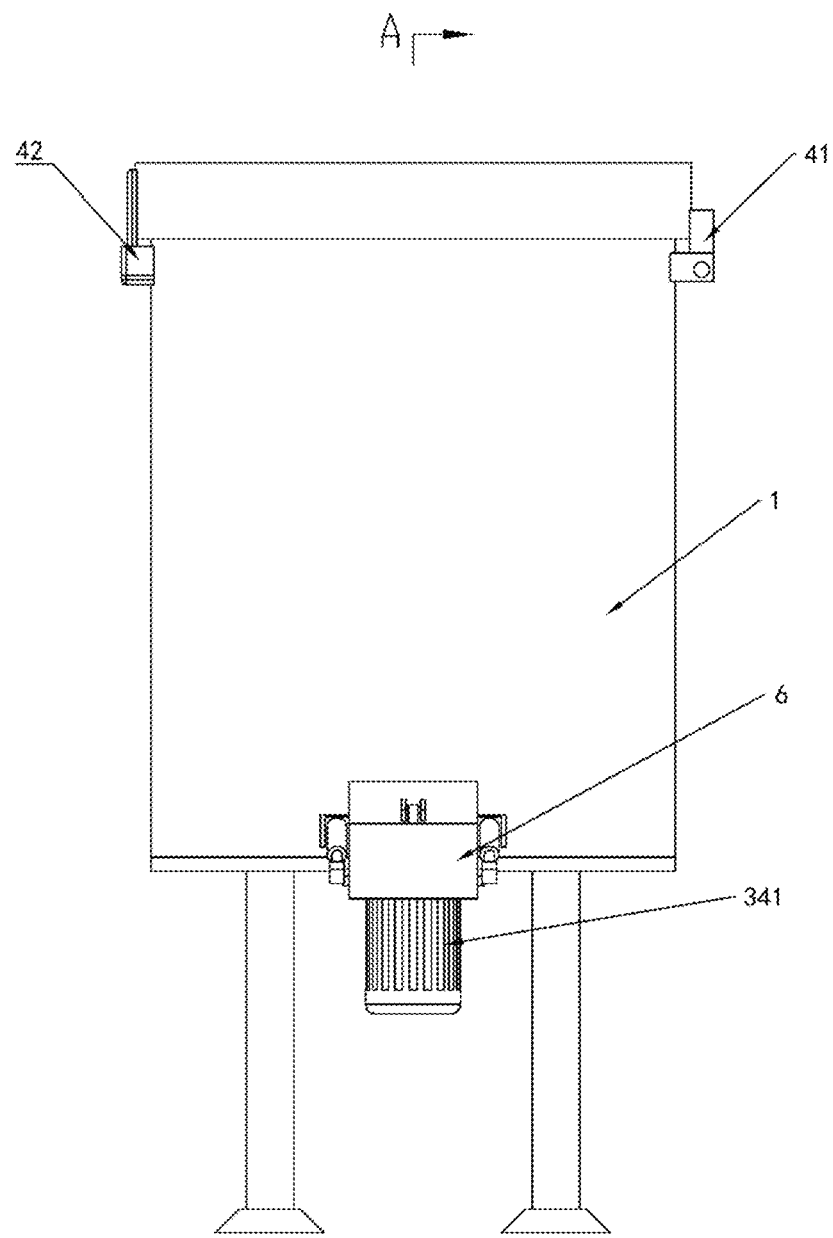
FIG. 2 is a main view of the present application.
Figure 3:
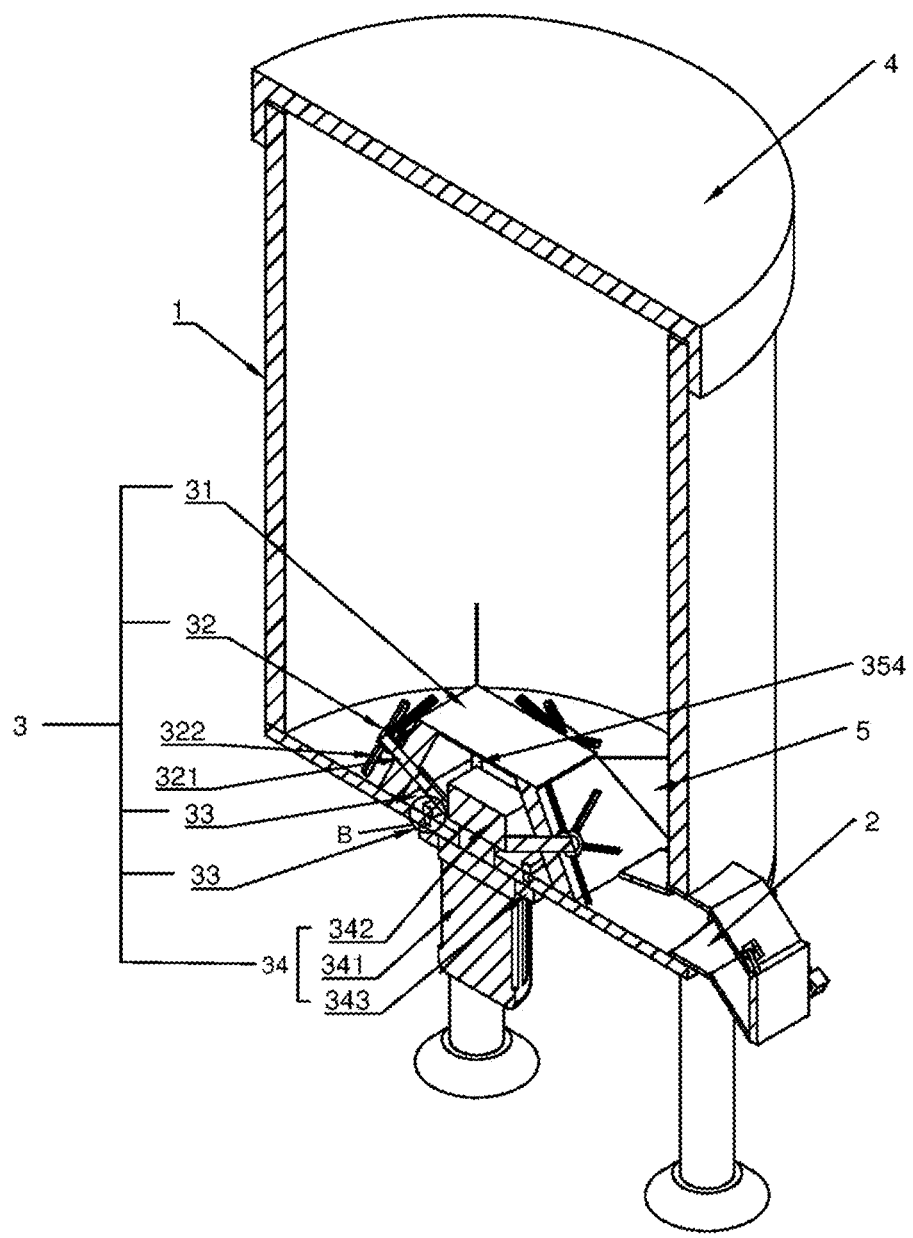
FIG. 3 is an isometric side sectional view of the present application at A-A in FIG. 2.

As shown in FIGS. 1 and 3, the present application proposes a tool-integrated medical waste sterilization processing barrel, including a treatment barrel 1, a discharge port 2 set at a bottom edge of the treatment barrel 1, and an integrated cutting tool set at the bottom of the treatment barrel 1.

The integrated cutting tool includes a mounting block 31 in a shape of truncated square pyramid, the mounting block has a cutter 32 on each bevel, the cutter 32 is in a plane parallel to the corresponding bevel of the mounting block 31, the mounting block 31 has a power chamber 33 with a downward opening, the power chamber 33 has a power member 34, the input end of the cutter extends into the power chamber 34 and is connected to the output end of the power member 34.

A rotating member 35 is connected between the mounting block 31 and the treatment barrel 1.

The medical waste is crushed by means of cutter 32 set on the inclined surface of the mounting block 31, and because the plane where the cutter 32 are located is at an angle to the ground of the treatment barrel 1, it makes the cutter 32 bounce off the metal in the medical waste when they come in contact with it, after which the metal remains at the bottom of the treatment barrel 1 due to gravity, which reduces the contact area between the cutters and the metal in direct contact with the metal and reduces the cutters' wear rate compared to the cutters in the prior art that are parallel to the bottom surface of the treatment barrel setting, in the meanwhile the four the cutters 32 are distributed in a conical shape, which has a strong tearing force when dealing with longer waste and improves the crushing efficiency, and by the setting of the rotating member 35, when the material needs to be discharged, the rotating member 35 is activated, which causes the rotating member 35 to drive the mounting block 31 to rotate, and the cutter 32 on the mounting block 31 rotates accordingly, and at the same time with the cutter 32 rotating itself, it makes it easier for the crushed medical waste to be discharged from the discharge port 2, reducing the accumulation of waste in the treatment barrel 1, and at the same time when the mounting block 31 rotates, the four corners of the mounting block 31 push the waste to the outside, making it discharged from the discharge port 2.

As shown in FIG. 1, an end cover 4 is provided at the top of the treatment barrel 1, one end of the end cover 4 being hinged to the treatment barrel 1 by an articulating block 41, and the other end of the end cover 4 being connected to the treatment barrel 1 by a snap 42. When there is a need to put medical waste into the treatment barrel 1, the snap 42 is opened, the end cover 4 is opened and medical waste is put in, after which the end cover 4 is closed and the snap 42 is closed.

By the setting of the end cover 4, it makes the medical waste crushed in the treatment barrel 1 to avoid the residual liquid inside the medical waste from spilling out during crushing and polluting the environment.

As shown in FIG. 3, the power member 34 includes a motor 341 fixedly mounted at the bottom of the treatment barrel 1, the output end of the motor 341 extending upwardly through the treatment barrel 1 into the power chamber 33, the output end of the motor 341 being connected with a gear box 342 by transmission, the gear box 342 being connected to the input end of the cutter.

The gear box 342 is prior art and will not be repeated.

As shown in FIG. 3, the cutter includes a rotation shaft 321 rotatably attached to the mounting block, the axis of the rotation shaft 321 being perpendicular to the corresponding bevel of the mounting block, the rotation shaft 321 having a crushing knife fixedly set on it, the rotation shaft 321 extending through the mounting block into the power chamber 33, the rotation shaft 321 being connected to the gear box 342.

By the plane where the cutter 32 is located at an angle to the ground of the treatment barrel 1, so that when the cutter 32 comes into contact with the metal in the medical waste, it causes the metal to be bounced off, after which the metal remains at the bottom of the treatment barrel 1 due to gravity, reducing the contact area of the tool in direct contact with the metal and reducing the rate of cutter wear compared to the existing setting where the cutter is parallel to the bottom of the treatment barrel.

Figure 4:
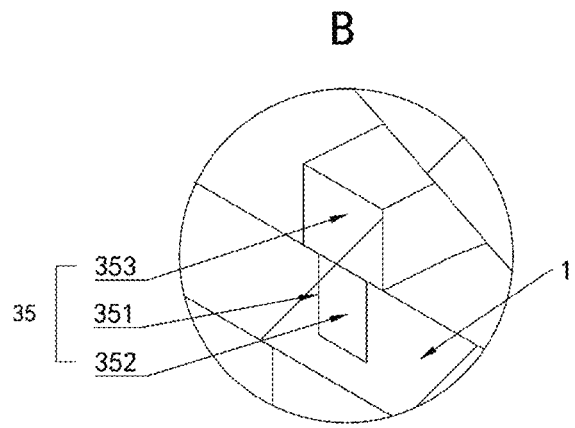
FIG. 4 is a partial enlarged view at B in FIG. 3 of the present application.

As shown in FIGS. 3 and 4, the rotating member includes an annular electromagnetic sliding chute 351 provided at the bottom of the treatment barrel 1, two symmetrically provided electromagnetic sliders 352 slidingly connected in the electromagnetic sliding chute 351, the electromagnetic sliders 352 extending upward into the power chamber 33, two the electromagnetic sliders 352 having fixed rings 353 fixedly connected at their upper ends, the fixed rings 353 having four fixed rods 354 fixedly connected evenly along the circumference, the fixed rods 354 being fixedly connected to the mounting block the fixing bars are fixedly connected to the mounting block.

By the setting of the electromagnetic sliding chute 351 with the electromagnetic slider 352, when the material needs to be discharged, the electromagnetic slider 352 makes a circular movement in the annular electromagnetic sliding chute 351, thus driving the mounting block 31 to rotate through the fixing ring 353 as well as the fixing rod 354 to facilitate discharging.

Figure 5:
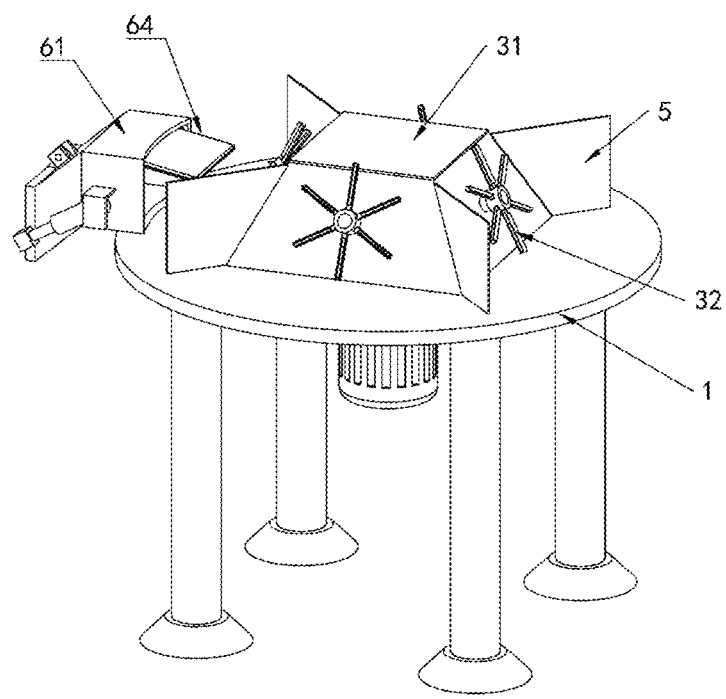
FIG. 5 is a schematic diagram of the structure of the integrated cutting tool of the present application.

As shown in FIGS. 3 and 5, a push plate 5 is fixedly connected to the corner of the mounting block, the treatment barrel 1 is cylindrical, the push plate 5 is perpendicular to the inner wall of the treatment barrel 1, and the push plate 5 is connected against the inner wall of the treatment barrel 1.

By the setting of the push plate 5, when the mounting block 31 is rotated, the mounting block 31 drives the push plate 5 to rotate to facilitate discharging.

As shown in FIGS. 1 and 3, the discharge mechanism 6 further includes an opening and closing plate 62 provided at an end of the discharge bin 61 away from the discharge port 2 for closing the discharge bin 61, an upper part of the opening and closing plate 62 being hinged with the upper part of the discharge bin 61, the discharge bin 61 having two electric telescopic rods 63 provided symmetrically at the front and rear sides, one end of the electric telescopic rod 63 being hinged to the opening and closing plate 62 and the other end of the electric telescopic rod 63 being hinged to the treatment barrel 1.

With the electric telescopic rod 63 being provided, when discharging is required, the electric telescopic rod 63 is activated, causing the electric telescopic rod 63 to elongate, thereby driving the opening and closing plate 62 to flip over, causing the discharge bin 61 to open, facilitating discharging.

Figure 6:
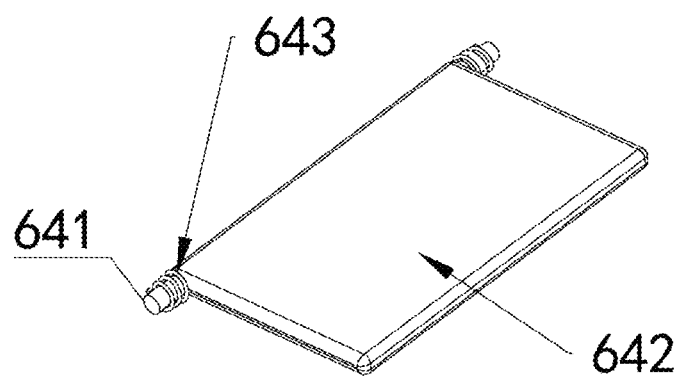
FIG. 6 is a schematic diagram of the structure of the auxiliary member of the present application.

As shown in FIGS. 5 and 6, the discharge bin 61 is provided with an auxiliary member 64 at one end connected to the treatment barrel 1, the auxiliary member 64 including an flip shaft 641 rotatably connected between the front and rear side walls of the discharge bin 61, the flip shaft 641 being fixedly snapped with an auxiliary plate 642, the auxiliary plate 642 extending into the treatment barrel 1, the auxiliary plate 642 being chamfered at the upper side edge of the auxiliary plate 642, the flip shaft 641 is connected to the inner wall of the discharge bin 61 with a torsion spring 643, and when the device is not in use, the auxiliary plate 642 is tilted downward from outside to inside along the radial direction of the treatment barrel 1 under the action of the torsion spring 643.

When the material needs to be discharged, the pushing plate 5 during the rotation is in contact with the auxiliary plate 642, causing the auxiliary plate 642 to flip downward, pushing out the crushed medical waste through the discharge bin 61, preventing the blockage of the discharge bin 61 and improving the discharge efficiency.

The motor 341 is fixedly provided with a mounting ring 343, and the mounting ring 343 is bolted to the bottom of the treatment barrel 1.

The above described is only a preferred embodiment of the present application, and it should be noted that for a person of ordinary skill in the art, several improvements and additions can be made without departing from the method of the present application, and these improvements and additions should also be considered as the scope of protection of the present application.

What is claimed is:

1. A tool-integrated medical waste sterilization processing barrel, comprising a treatment barrel, a discharge port set at a bottom edge of the treatment barrel, and an integrated cutting tool provided at a bottom of the treatment barrel; wherein the integrated cutting tool comprises a mounting block in a shape of truncated square pyramid, the mounting block has a plurality of bevels, the mounting block has a cutter on a corresponding bevel of the plurality of bevels, the cutter rotates in a plane parallel to the corresponding bevel, the mounting block has a power chamber with a downward opening, the power chamber has a power member, an input end of the cutter extends into the power chamber and is connected to an output end of the power member; a rotating member is connected between the mounting block and the treatment barrel;

the power member comprises a motor fixedly mounted at the bottom of the treatment barrel, an output end of the motor extends upwardly through the treatment barrel into the power chamber, the output end of the motor is connected to a gear box by a transmission, the gear box is connected to the input end of the cutter; the cutter comprises a rotating shaft rotatably attached to the mounting block, an axis of the rotating shaft is perpendicular to the corresponding bevel of the mounting block, a crushing knife is fixedly set on the rotating shaft, the rotating shaft extends through the mounting block into the power chamber, and the rotating shaft is connected to the gear box.

2. The tool-integrated medical waste sterilization processing barrel according to claim 1, wherein the rotating member comprises an annular electromagnetic sliding chute provided at the bottom of the treatment barrel, two symmetrically arranged electromagnetic sliders are slidingly connected in the electromagnetic sliding chute, the electromagnetic sliders extends upward into the power chamber, upper ends of the two electromagnetic sliders are fixedly connected with fixed rings, the fixed rings are uniformly attached with four fixed rods along a circumferential direction, the fixed rods are fixedly connected to the mounting block.

3. The tool-integrated medical waste sterilization processing barrel according to claim 1, wherein a push plate is fixedly connected to a corner of the mounting block, the treatment barrel is cylindrical, the push plate is perpendicular to an inner wall of the treatment barrel, and the push plate is connected against the inner wall of the treatment barrel.

4. The tool-integrated medical waste sterilization processing barrel according to claim 1, wherein an end cover is provided at a top of the treatment barrel, the end cover has a first end and a second end, the first end is hinged to the treatment barrel by an articulating block, and the second end is connected to the treatment barrel by a snap.

5. The tool-integrated medical waste sterilization processing barrel according to claim 1, wherein the motor is fixedly provided with a mounting ring, and the mounting ring is bolted to the bottom of the treatment barrel.

\* \* \* \* \*